Feb. 20, 1934.   C. E. BENNETT   1,947,455
CABLE CONSTRUCTION
Filed March 3, 1932
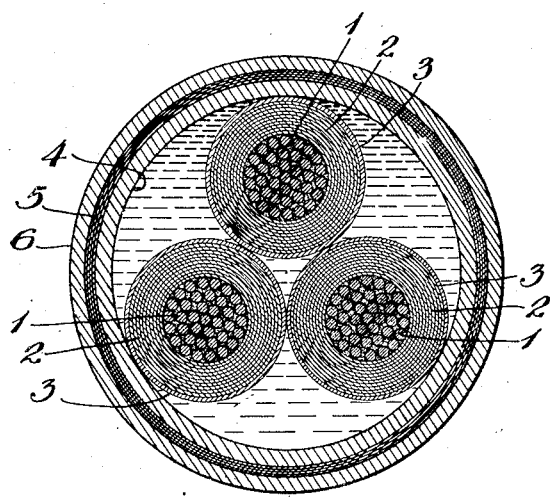
INVENTOR.
Charles E. Bennett
BY
Riddle, Margeson and Hornidge
ATTORNEYS.

Patented Feb. 20, 1934

1,947,455

UNITED STATES PATENT OFFICE 1,947,455

CABLE CONSTRUCTION

Charles E. Bennett, Hawthorne, N. J., assignor to The Okonite-Callender Cable Company, Incorporated, Paterson, N. J., a corporation of New Jersey Application March 3, 1932. Serial No. 596,495

1 Claim. (Cl. 173—266)

My invention is directed to an improvement in electric cable construction whereby the trouble heretofore experienced with stretching and bursting of the lead sheath covering of the cable is eliminated.

Oil filled electric cables are usually insulated and oil filled, and upon heating during operation the impregnating compound expands causing internal stresses and pressures tending to elongate and burst the lead sheath. Furthermore difference in elevations of the cable will sometimes build up sufficient pressure to burst or rupture the sheath at low points along its length.

My invention provides a construction whereby this sheath trouble is eliminated or at least reduced to a minimum, and in addition provides a construction which is sufficiently flexible successfully to withstand the bending necessary in manufacturing, installing and jointing.

In the accompanying drawing I have illustrated an embodiment of my invention in section.

Referring to the drawing in detail, 1 designates the cable conductors. I have shown a three conductor cable for purposes of illustration only, it being understood that the number of conductors is immaterial to my invention. The conductors 1 are of the stranded type and I propose to fill the interstices between the strands with any material capable of preventing flow of the insulating compound along the conductor. For instance, I may fill these interstices with petrolatum, or they may be filled with soft solder, some material at any rate which will prevent the flow of the insulating liquid along the interstices of the conductors, but which at the same time will not detrimentally impair the flexibility of the cable.

On the outside of the conductors I provide the usual oil impregnated paper insulation 2, and on the outside of this insulation I provide metal tape 3 such as a thin copper tape, preferably interlocked with the paper insulation.

A soft metal sheath 4 such as lead is then applied about the whole structure.

About this soft metal sheath I apply a resilient tape 5, preferably non-metallic, such as heavy convas, the strength of the same to be predetermined and to be dependent upon the maximum pressure generated in the cable. Instead of using tape I may apply a cotton or linen braid about the sheath 4, this braid being single, double, triple or other thickness required. This tape is then covered with a soft metal sheath 6 such as lead which protects it from mechanical injury, moisture or any destructive elements that may be in underground structures.

It will be appreciated from all of the foregoing that by covering the sheath 4 with fibrous tape or braid, as the case may be, this material by reason of its elasticity will restore the sheath to its original form should the same be stretched due to internal pressures in the cable.

It will be appreciated also that by filling the interstices of the conductor of the cable, the volume of insulating liquid is much reduced, and hence a corresponding decrease results in the pressures generated in the cable due to its operation.

If desired the outer surface of the tape sheath 5 may be sprayed with metal, tending to form a better bond between the lead sheath 6 and this tape sheath. It is to be understood also that the tape sheath may be impregnated with oil, shellac, bakelite, bitumen and other protective materials.

I wish it to be understood that the sheaths 4 and 6 may be of different alloys.

While my invention provides a construction primarily intended to overcome permanent deforming of the sheath 4 due to pressure in the cable, my construction provides a further advantageous feature in that, if in the operation of applying these sheaths there should be a defect in the inner sheath by way of a blow hole for instance yet the insulating compound will not be lost because of the outer sheath, while any defects in the outer sheath are immaterial provided there are no defects in the inner sheath.

What I claim is:—

An electric cable comprising in combination a conductor, oil impregnated insulation about the conductor, a soft metal sheath about the insulation, a resilient fibrous covering about the exterior of the sheath permitting expansion of the sheath from pressures built up in the cable due to temperature rises and adapted to restore said sheath to its original form on lowering of said pressures, and a continuous impervious outer protective metal covering about the said resilient fibrous covering.

CHARLES E. BENNETT.